April 16, 1968  R. L. HURD  3,377,907
BLIND FASTENER
Filed March 10, 1965  3 Sheets-Sheet 1
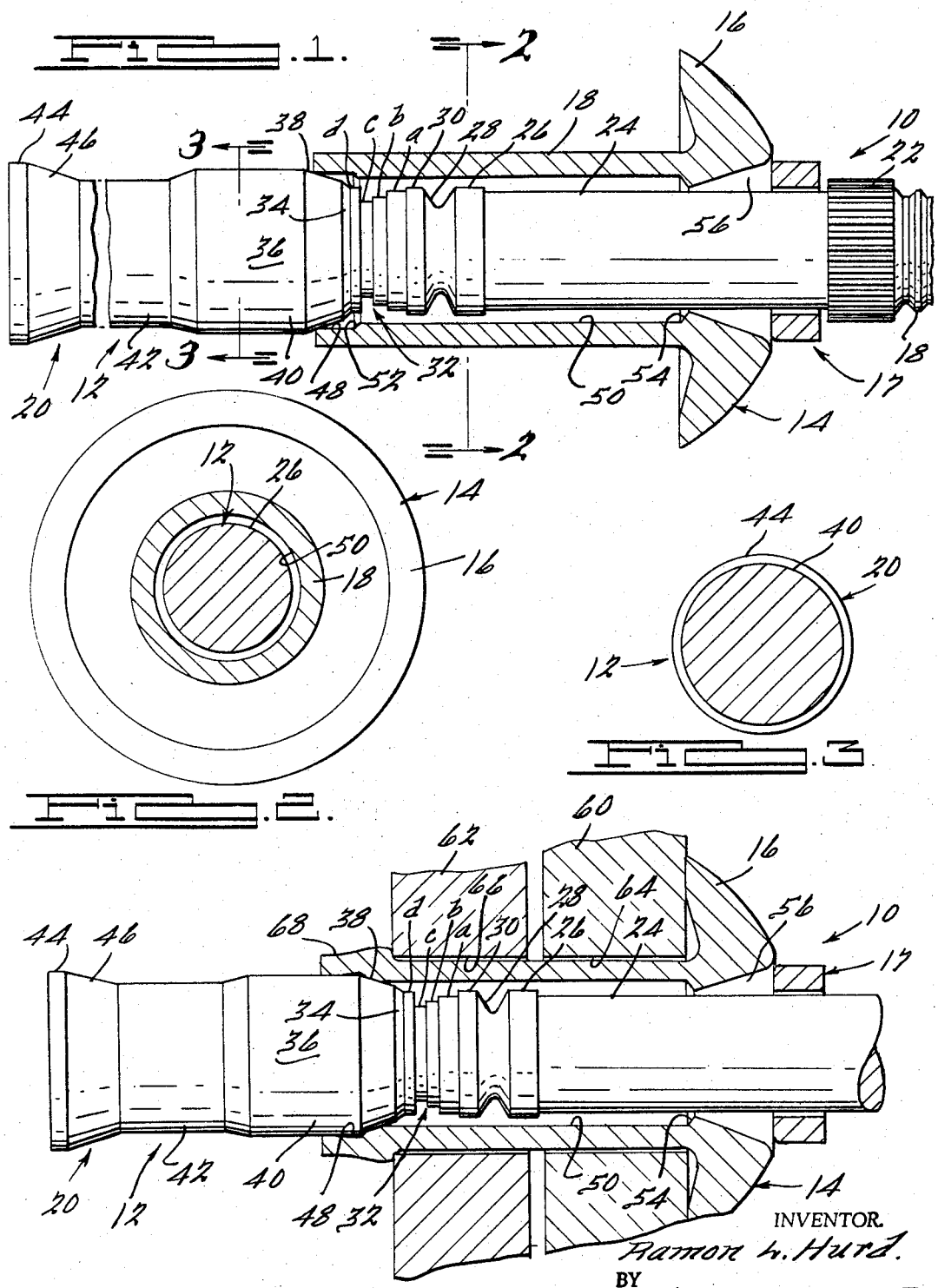
INVENTOR.
Ramon L. Hurd.
BY
Harness, Dickey & Pierce
ATTORNEYS.

April 16, 1968  R. L. HURD  3,377,907
BLIND FASTENER
Filed March 10, 1965  3 Sheets-Sheet 2
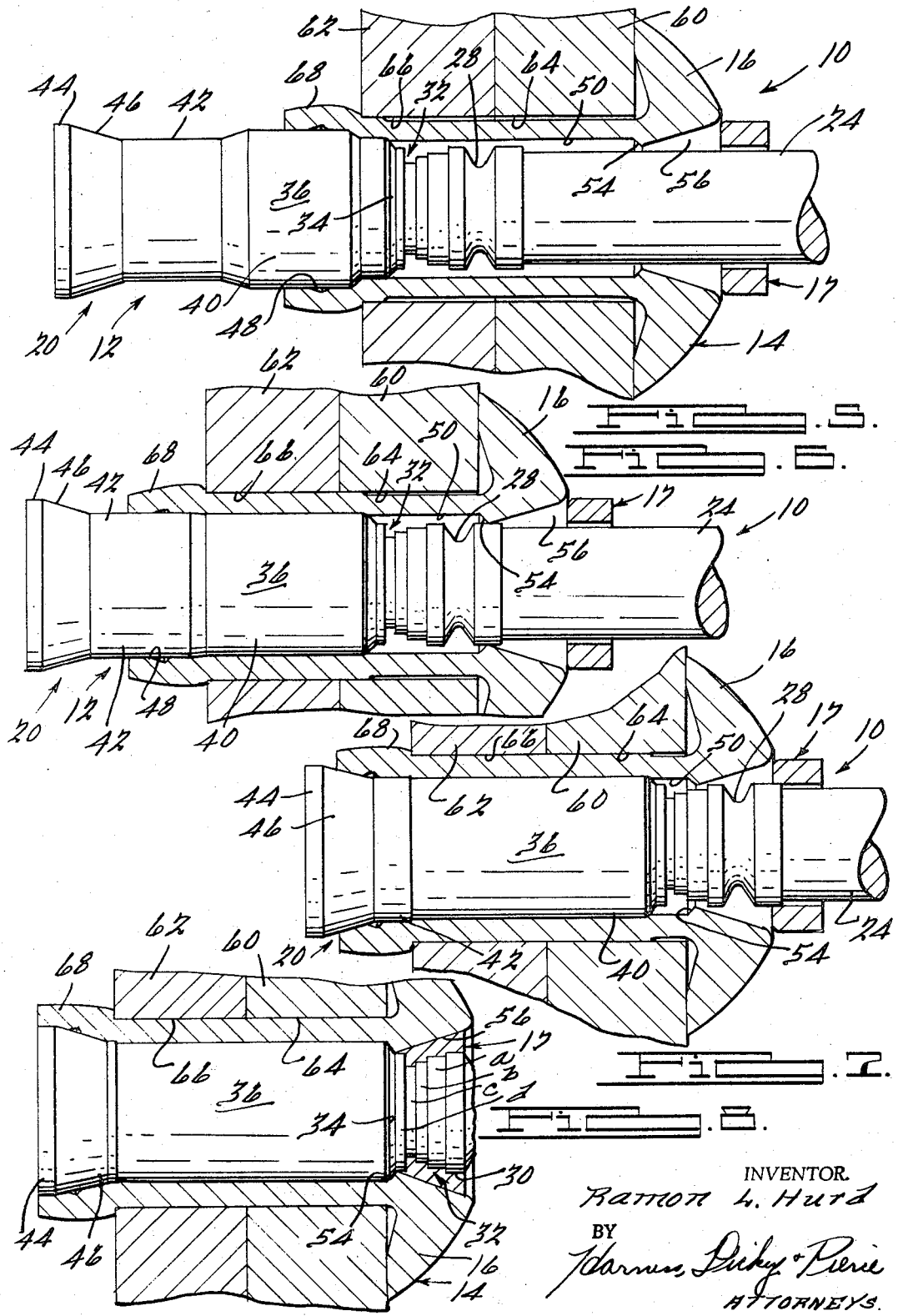
INVENTOR.
Ramon L. Hurd
BY
Harness, Dickey & Pierce
ATTORNEYS.

April 16, 1968 R. L. HURD 3,377,907
BLIND FASTENER
Filed March 10, 1965 3 Sheets-Sheet 3
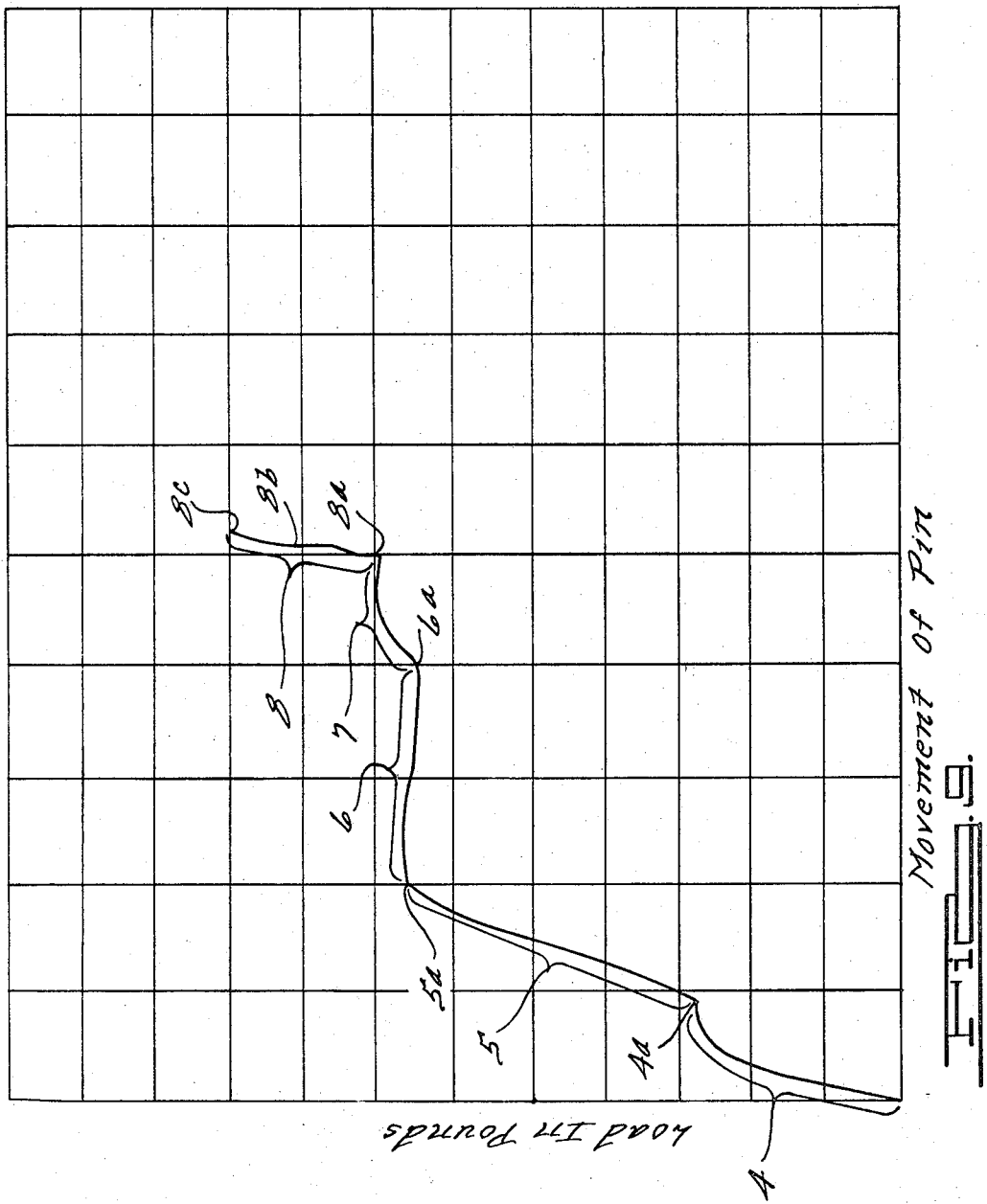
INVENTOR.
Ramon L. Hurd

United States Patent Office 3,377,907
Patented Apr. 16, 1968

3,377,907
BLIND FASTENER
Ramon L. Hurd, Royal Oak, Mich., assignor to Huck Manufacturing Company, Detroit, Mich., a corporation of Michigan
Filed Mar. 10, 1965, Ser. No. 438,672
9 Claims. (Cl. 85—78)

This invention relates to fasteners, and more particularly to multipiece blind-type fasteners.

The multipiece blind rivet of the present invention includes a pin and a sleeve and is generally of the type as shown in the Huck Patent No. 2,526,235, issued Oct. 17, 1950. One of the problems present with fasteners of that type has been in obtaining good pull together between the sheets or plates being fastened. One of the primary objects of the present invention is to provide good pull together of the sheets secured together by the fastener.

In fasteners of the above-mentioned type, a lock is provided between the pin and the sleeve. It is another object of the present invention to provide an improved lock construction for locking the pin to the sleeve.

In fasteners of the type shown in the above-mentioned Huck patent, it is also desirable that the pin be capable of expanding the sleeve thereby providing for a proper fit or fill of the sleeve within an oversized hole. Therefore, it is another object of the present invention to provide an improved multipiece blind fastener of the type described having hole filling characteristics.

It is a general object of the present invention to provide an improved multipiece blind type fastener.

Other objects, features, and advantages of the present invention will become apparent from the subsequent description and the appended claims, taken in conjunction with the accompanying drawings, in which:

FIG. 1 is a side elevational view of a rivet assembly embodying the features of the present invention and includes a pin, a sleeve, and a locking collar with the sleeve and locking collar shown in longitudinal section;

FIG. 2 is a cross-sectional view of the fastener of FIGURE 1 taken generally along the line 2—2;

FIG. 3 is a sectional view of the fastener of FIGURE 1 taken generally along the line 3—3;

FIG. 4 is a fragmentary side elevational view similar to that of FIGURE 1 depicting the fastener in assembly relation with a pair of plates to be secured together and after partially setting the fastener;

FIG. 5 is a view similar to that of FIGURE 4 showing the fastener in a succeeding stage in the setting operation after it has pulled the workpieces together;

FIG. 6 is a view similar to FIGURE 5, showing the fastener in a next succeeding stage;

FIG. 7 is a view similar to FIGURE 6 showing the fastener at a later stage in the setting operation;

FIG. 8 depicts the fastener and workpieces upon completion of the setting operation; and FIG. 9 is a graphical presentation, known as a swage curve, of the load in pounds as applied between the pin and sleeve of the fastener versus the movement of the pin.

Looking now to FIGURE 1, a three-piece fastener is generally indicated by the numeral 10 and comprises an elongated pin 12, a tubular sleeve 14 and an annular lock ring 17. The longated pin 12 is provided at its forward end with a plurality of annular pull grooves 18 and at the rearward end with an enlarged head 20. The pull grooves 18 extend generally to a splined portion 22 which has a maximum diameter slightly larger than the maximum diameter of the pull grooves 20 for a purpose to be presently seen. Adjacent the splined portion 22 is a reduced diameter portion 24 which extends to an enlarged annular land portion 26. Adjacent the land portion 26 is a reduced breakneck groove 28 which represents the weakest section of the pin 12. Immediately adjacent the breakneck groove 28 is an enlarged annular land portion 30 which is followed by a locking groove portion 32. The locking groove portion 32 is constructed with a plurality of stepped land portions *a, b, c* which are consecutively of reduced diameters. A final land *d* is of an increased diameter larger than the diameters of the lands *a, b,* and *c* and is substantially equal to the diameter of the lands 26 or 30. A tapered stop shoulder 34 is located adjacent the land *d* and is in turn adjacent to a wire drawing section 36. The wire drawing section 36 includes three portions: a tapered portion 38 at its forward end which has a relatively gradual taper to facilitate wire drawing and which blends into an intermediate enlarged body portion 40 and a rearward portion 42 which is of a diameter slightly less than that of the body portion 40. The wire drawing section 36 serves a purpose to be described. Immediately adjacent the wire drawing section 36 is the head 20. Note that the head 20 has a terminating annular land portion 44 and a tapered body portion 46 which blends into the reduced diameter portion 42.

The tubular sleeve 14 is provided with an enlarged head 16 at its forward end which is connected to a shank portion 18 having a relatively uniform outside diameter. The sleeve 14 is hollow and has a main bore 50 which terminates at the rearward end of the shank portion 18 in a counterbore 48; an inclined tapered shoulder 52 is defined at the juncture of bores 48 and 50. The main bore 50 extends to a point just proximate the beginning of the head 16 and terminates there in a reduced diameter stop shoulder 54. Immediately adjacent the stop shoulder 54 is a radially outwardly flaring lock cavity 56 which is located in the head and serves a purpose to be readily seen.

The locking ring 17 is preferably of a split construction and is normally located proximate the head 16 and the forward opening of the cavity 56, as shown in FIGURE 1. The locking ring 17 normally has an internal diameter slightly larger than the outside diameter of the pull grooves 18 and hence can be readily moved thereover and is of a diameter slightly less than the maximum diameter defined by the splined portion 22. As the ring 17 is moved over the splined portion 22, the split permits it to expand and to snap onto the reduced diameter portion 24 whereby the ring 17 is retained onto the pin 12.

The reduced diameter portion 24 is of a diameter slightly less than the minimum diameter of the bore through the sleeve 14 (see FIGURE 2) as are the lands 26 and 30. However, the stop shoulder 34 on pin 12 is of a diameter greater than the minimum diameter of the stop shoulder 54 on sleeve 14 and hence as the pin 12 is moved axially through the bore of the sleeve 14, the stop shoulders 34 and 54 will eventually engage to substantially stop further movement of the pin 12.

The diameters of part of the tapered portion 38, of the body portion 40, and of the rearward portion 42 of the wire drawing section 36 are larger than the diameter of the counterbore 48 and hence of the shoulder 52. Note that the maximum diameter of the head 20 is slightly larger than the diameter of the body portion 40 of the wire drawing section 36 (see FIGURE 3).

Looking now to FIGURE 4, the fastener 10 is shown as assembled with a pair of workpieces 60 and 62 which are located spaced from each other and which have generally inline bores 64 and 66, respectively. Note that the inline bores 64 and 66 are somewhat larger than the outside diameter of the shank portion 18 of the sleeve 14. With the head 16 in engagement with the forward workpiece 60, the fastener 10 can be set by an appropriate tool, generally of the type shown in the patent to Huck, supra, the details of which do not constitute a part of the present invention and hence have been omitted for the purposes of simplicity. The tool grips the pin 12 at the pull groove 18 and engages the head 16 and applies a relative axial force between the pin 12 and the sleeve 14. Upon initial relative movement between pin 12 and sleeve 14, the taper 38 is pulled into and through the counterbore 48 to begin the formation of a tulip head 68 at the rearward end of the sleeve 14 at the blind side of workpieces 60 and 62, see FIGURE 4. As this relative motion continues, the tulip head 68 eventually engages the rearward workpiece 62 pulling it forwardly into engagement with the forward one of the workpieces 60 and the fastener then is in the condition as shown in FIGURE 5. Upon further relative motion between the pin 12 and the sleeve 14, and as the tapered portion 38 is pulled into the main bore 50, the shank 18 of the sleeve 14 is extended radially outwardly to fill the holes 66 and 64 with the excess volume of material in the wire drawing section 36 moving into length as wire drawing occurs, i.e., the section 36 elongates, as shown in FIGURE 6. The wire drawing is a maximum with body portion 40 and reduces with reduced diameter portion 42. The relative movement continues with the hole filling and wire drawing continuing and eventually the reduced diameter portion 42 is moved into the main bore 50 and the enlarged head 20 is moved into the counterbore 48, as shown in FIGURE 7. Upon additional relative axial movement between the pin 12 and the sleeve 14, the head 20 is moved further into the opening at the rearward end of the sleeve 14 hence causing it to expand radially outwardly even further, as shown in FIGURE 8, providing for an enlarged head at the blind side of the workpiece 62. Further relative movement is substantially stopped when the stop shoulder 34 on the pin 12 engages the stop shoulder 54 in the bore in the sleeve 14. When this occurs the relative axial force continues to build up until a tubular portion of the tool (see Huck patent, supra) is caused to move axially forwardly to engage the split lock ring 17 moving the lock ring 17 into the cavity defined by the lock cavity 56 in the head 16 and the stepped locking groove portion 32 in the pin 12. Note that the splined portion 22 acts as a guide for the tubular portion of the tool which engages the ring 17. As the relative axial force is increased further, the pin 12 is broken at the breakneck groove 28 and the setting operation is done with the fastener having the constructional arrangement generally shown in FIGURE 8. Note that the axial length of the wire drawing section 36 is less than the axial distance from the shoulder 54 to the free end of the shank 18 of sleeve 14 and is also less than the distance from stop shoulder 54 to counterbore shoulder 52; hence, the precise amount of penetration of head portion 20 in counterbore 48 will depend upon the amount of wire drawing of wire drawing section 36 which in turn will be determined by the amount of hole filling required.

A graphical presentation of the sequence of operations is shown in FIGURE 9 in which the X-axis, or abscissa, is plotted in terms of movement of the pin and the Y-axis, or ordinate, is plotted in terms of relative load between the pin and sleeve as applied in pounds. Note that upon initial relative movement between the pin and the sleeve, as indicated by the section marked 4, the load increases to a first level 4a, which generally corresponds to the position of parts as shown in FIGURE 4. Here formation of the head 68 is initiated. As the load is increased, as indicated by the section 5, further relative movement of the pin occurs pulling the sheets together with the load reaching a second level 5a at which the parts have positions generally as shown in FIGURE 5. Here further formation of the head 68 has occurred. As the load increases and further axial movement of the pin 12 occurs, the shank portion 18 of the sleeve 14 is expanded radially outwardly to fill the holes 66 and 64 and wire drawing of the excess pin material occurs; this is indicated by the section 6 which includes the parts in positions generally as shown in FIGURE 6. Note that the load begins to drop from level 5a to level 6a. This is caused by a reduction in wire drawing as the reduced diameter portion 42 enters the main bore 50. The reduction in wire drawing serves a purpose to be presently understood. Upon further relative movement, the head portion 20 engages the rearward end of the shank portion 18 of the sleeve 14, as shown in FIGURE 7, and the load increases as shown at section 7 (FIGURE 9) up to a new level 8a at which the stop shoulders 54 and 34 are in engagement. At this point, the lock cavity 56 and locking groove 32 are in line with each other. From here the load moves up rapidly with only slight movement of the pin 12. This is indicated by the section 8. When the load reaches a preselected value as at 8b, the locking ring 17 is set into the cavity defined by the lock cavity 56 and lock groove 32. When the load reaches the value at 8c, the pin 12 fractures at the breakneck groove 28 and the setting of fastener 10 has been completed.

As previously noted, in the section 6 the load generally does not increase and in fact drops in magnitude from the level 5a to the level 6a. If the reduced diameter portion 42 of wire drawing section 36 were of the same diameter as the intermediate portion 40, the load level in section 6 would increase substantially from level 5a to level 6a. Then in section 7, as the head 20 engaged the end of the sleeve 14, the same incremental increase from load level 6a to 8a as shown in FIGURE 9 would occur, with the result that load level 8a at which the stop shoulders 34 and 54 would engage could now be quite close to the load level 8b at which the locking ring 17 is set. Note that the load level 8b at which the locking ring 17 is set is a function of the mechanism of the tool and some slight variations in this point 8b can occur with different tools. In addition, slight production differences can occur between different ones of the same fasteners. Thus, in view of the tool and fastener variations possible, it is important that there be an adequate differential between the load levels at 8a and 8b to assure that the stop shoulders 34 and 54 are engaged before the lock ring 17 is swaged into the cavity defined by the lock cavity 56 and the locking groove 32. Of course, if the stop shoulders 34 and 54 are not engaged, the cavity 56 and groove 32 will not be in proper alignment and proper swaging of the lock ring 17 cannot be accomplished and the fastener will not be properly set. The above problem is obviated by the provision of the reduced diameter portion 42 which assures that a sufficient increment will exist between load levels 8a and 8b to compensate for tool and fastener variations and hence assure the proper setting of the fastener 10.

Note that with the provision of the stepped construction of the locking groove 32, the ring 17 in its final set condition, as shown in FIGURE 8, engages the shoulders formed thereby; this provides for a tight grip preventing the slipping of the swaged lock ring 17 outwardly from the cavity and enhances the lock between the sleeve 14 and the remainder of the pin 12. Note also that with the provision of the enlarged head portion 20, the rearward end of the sleeve 14 is flared out further resulting in a larger and hence more substantial blind head structure at the blind side of the rearward workpiece 62.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. A multipiece rivet for fastening a pair of work pieces having aligned openings comprising: a hollow sleeve having a shank portion adapted to project through the aligned openings and beyond one side of the workpieces and having a preformed head on one end of said shank portion for engaging the other side of the workpieces, a pin located within said sleeve and extending beyond both ends thereof, head forming means on that end of said pin proximate to the opposite end of said shank portion for engaging said opposite end and for forming a bulbed head at said opposite end as said pin is moved relatively through said sleeve, lock receiving means in said preformed head and said pin for defining a lock receiving cavity with said pin and said sleeve located in preselected relative positions, and lock means deformable into said cavity for locking said pin and said sleeve together, said lock receiving means comprising an annular locking groove in said pin having a finite plurality of annular portions of varying diameters defining a finite plurality of steps decreasing in diameter in a direction toward said head forming means.

2. A multipiece rivet for fastening a pair of workpieces having aligned openings comprising: a hollow sleeve having a shank portion adapted to project through the aligned openings and beyond one side of the workpieces and having a preformed head on one end of said shank portion for engaging the other side of the workpieces, said sleeve having a through bore terminating in a counterbore at the other end of said shank and a radially outwardly flaring cavity in said head, a sleeve stop shoulder extending radially inwardly at a point proximate to the termination of said cavity and defining the minimum diameter opening through said sleeve, a pin, pull means for gripping said pin located at one end of said pin, an axially splined portion located adjacent said pull means and having a maximum diameter greater than the diameter of said pull means and slightly greater than said minimum opening defined by said stop shoulder of said sleeve, a reduced diameter portion located adjacent said splined portion and having a diameter less than said splined portion and less than said minimum opening, an annular breakneck groove located adjacent said reduced diameter portion and defining the weakest section of said pin, a locking groove located adjacent said breakneck groove and having a maximum diameter less than said minimum opening and including a plurality of annular lands successively decreasing in diameter from a first of said lands and further including a last land having a diameter substantially equal to the diameter of said first land, a pin stop shoulder located adjacent said last land and being of a diameter to engage said sleeve stop shoulder, a wire drawing portion located adjacent said pin stop shoulder and including a first tapered portion tapering to a selected diameter slightly greater than the diameter of said counterbore, a straight, cylindrical body portion having a diameter of said selected diameter, and a reduced portion having a diameter greater than that of said through bore and slightly less than that of said selected diameter, and a head portion terminating the opposite end of said pin and having a tapered portion tapering from a diameter equal to that of said reduced portion to a diameter slightly greater than said selected diameter, said pin having a first axial length from said pin stop shoulder to the beginning of said head portion being less than that from said sleeve stop shoulder to said other end of said shank such that with said pin and sleeve stop shoulders engaged said head portion engages said other end of said shank and said cavity in said preformed head is aligned with said locking groove to define a locking cavity, a radially split, annular locking ring having an inside diameter less than the maximum diameter of said splined portion and being locatable on said reduced diameter portion and being swagable in said locking cavity for engaging the surfaces of said cavity and said plurality of lands for positively locking said pin and said sleeve together.

3. A multipiece rivet for fastening a pair of workpieces having aligned openings comprising: a hollow sleeve having a shank portion adapted to project through the aligned openings and beyond one side of the workpieces and having a preformed head on one end of said shank portion for engaging the other side of the workpieces, said sleeve having a through bore terminating in a cavity in said head, a sleeve stop shoulder extending radially inwardly in said through bore and defining the minimum diameter opening through said sleeve, a pin, pull means for gripping said pin located at one end of said pin, an enlarged head portion located at the opposite end of said pin, an annular breakneck groove located on and defining the weakest section of said pin, a locking groove located adjacent said breakneck groove, a pin stop shoulder on said pin being of a diameter to engage said sleeve stop shoulder and located to engage said sleeve stop shoulder with said locking groove in alignment with said cavity, a first wire drawing portion located adjacent said pin stop shoulder and including a first tapered portion tapering to a preselected diameter, a straight, cylindrical body portion having a diameter of said preselected diameter, and a reduced second wire drawing portion adjacent said first wire drawing portion at the end thereof opposite said pin stop shoulder having a diameter greater than that of said through bore and slightly less than that of said preselected diameter, said wire drawing portion adapted to be wire drawn and located in said through bore as said pin and said sleeve are set and said reduced wire drawing portion adapted to be wire drawn and at least partially located in said through bore as said pin and said sleeve are set, and lock means deformable into said cavity and said locking groove for locking said pin and said sleeve together.

4. A multipiece rivet for fastening a pair of workpieces having aligned openings comprising: a hollow sleeve having a shank portion adapted to project through the aligned openings and beyond one side of the workpieces and having a preformed head on one end of said shank portion for engaging the other side of the workpieces, said sleeve having a through bore terminating in a cavity in said head, a sleeve stop shoulder extending radially inwardly in said through bore and defining the minimum diameter opening through said sleeve, a pin, pull means for gripping said pin located at one end of said pin, an annular breakneck groove located on and defining the weakest section of said pin, a locking groove located adjacent said breakneck groove, a pin stop shoulder on said pin being of a diameter to engage said sleeve stop shoulder and located to engage said sleeve stop shoulder with said locking groove in alignment with said cavity, a first wire drawing portion located adjacent said pin stop shoulder and including a first tapered portion tapering to a preselected diameter, a straight, cylindrical body portion having a diameter of said preselected diameter, and a reduced second wire drawing portion adjacent said first wire drawing portion at the end thereof opposite said pin stop shoulder having a diameter greater than that of said through bore and slightly less than that of said preselected diameter, said wire drawing portion adapted to be wire drawn and located in said through bore as said pin and said sleeve are set and said reduced wire drawing portion adapted to be wire drawn and at least partially located in said through bore as said pin and said sleeve are set, and lock means deformable into said cavity and said locking groove for locking said pin and said sleeve together, and a head portion terminating the opposite end of said pin and having a tapered portion tapering from a diameter equal to that of said reduced portion to a diameter slightly greater than said selected diameter.

5. A multipiece rivet for fastening a pair of workpieces having aligned openings comprising: a hollow sleeve having a shank portion adapted to project through the aligned openings and beyond one side of the workpieces and having a preformed head on one end of said shank portion for engaging the other side of the workpieces, said sleeve having a through bore terminating in a cavity in said head, a sleeve stop shoulder extending radially inwardly in said through bore and defining the minimum diameter opening through said sleeve, a pin, pull means for gripping said pin located at one end of said pin, an annular breakneck groove located on and defining the weakest section of said pin, a locking groove located adjacent said breakneck groove, including a finite plurality of annular lands successively decreasing in diameter from a first of said lands in a direction towards the opposite end of said pin, a pin stop shoulder on said pin being of a diameter to engage said sleeve stop shoulder and located to engage said sleeve stop shoulder with said locking groove in alignment with said cavity, a wire drawing portion located adjacent said pin stop shoulder and including a first tapered portion tapering to a preselected diameter, a straight, cylindrical body having a diameter of said preselected diameter, and a head portion terminating the opposite end of said pin and having a tapered portion tapering to a diameter slightly greater than said preselected diameter, and lock means comprising a ring member deformable into said cavity and said locking groove for locking said pin and said sleeve together.

6. A multipiece rivet for fastening a pair of workpieces having aligned openings comprising: a hollow sleeve having a shank portion adapted to project through the aligned openings and beyond one side of the workpieces and having a preformed head on one end of said shank portion for engaging the other side of the workpieces, said sleeve having a through bore terminating in a cavity in said head, a sleeve stop shoulder extending radially inwardly in said through bore and defining the minimum diameter opening through said sleeve, a pin, pull means for gripping said pin located at one end of said pin, an annular breakneck groove located on and defining the weakest section of said pin, a locking groove located adjacent said breakneck groove and including a finite plurality of annular lands successively decreasing in diameter in the direction away from said one end of the pin, a pin stop shoulder located on said pin being of a diameter to engage said sleeve stop shoulder and located to engage said sleeve stop shoulder with said locking groove in alignment with said cavity, a wire drawing portion located adjacent said pin stop shoulder and including a first tapered portion tapering to a preselected diameter, a straight, cylindrical body portion having a diameter of said preselected diameter, and a reduced wire drawing portion having a diameter greater than that of said through bore and slightly less than that of said preselected diameter, said wire drawing portion adapted to be wire drawn and located in said through bore as said pin and said sleeve are set and said reduced wire drawing portion adapted to be wire drawn and at least partially located in said through bore as said pin and said sleeve are set, and a head portion terminating the opposite end of said pin and having a tapered portion tapering from a diameter equal to that of said reduced portion to a diameter slightly greater than said preselected diameter, and lock means comprising a ring member deformable into said cavity and said locking groove for locking said pin and said sleeve together.

7. A multipiece rivet for fastening a pair of workpieces having aligned openings comprising: a hollow sleeve having a shank portion adapted to project through the aligned openings and beyond one side of the workpieces and having a preformed head on one end of said shank portion for engaging the other side of the workpieces, a pin located within said sleeve and extending beyond both ends thereof, head forming means on that end of said pin proximate to the opposite end of said shank portion for engaging and moving into said opposite end and for expanding said opposite end radially outwardly for forming a bulbed head at said opposite end as said pin is moved relatively through said sleeve, said head forming means comprising an enlarged head portion terminating that end of said pin, said head forming means comprising a first wire drawing portion having a maximum preselected diameter larger than that of said through bore and a second wire drawing portion having a maximum diameter greater than said preselected diameter but less than said first portion, said first wire drawing portion adapted to be wire drawn and located in said through bore as said pin and said sleeve are set and said second wire drawing portion adapted to be wire drawn and at least partially located in said through bore as said pin and said sleeve are set, lock receiving means in said preformed head and said pin for defining a lock receiving cavity with said pin and said sleeve located in preselected relative positions, and lock means deformable into said cavity for locking said pin and said sleeve together.

8. A multipiece rivet for fastening a pair of workpieces having aligned openings comprising: a hollow sleeve having a shank portion adapted to project through the aligned openings and beyond one side of the workpieces and having a preformed head on one end of said shank portion for engaging the other side of the workpieces, a pin located within said sleeve and extending beyond both ends thereof, head forming means on that end of said pin proximate to the opposite end of said shank portion for engaging and moving into said opposite end and for expanding said opposite end radially outwardly for forming a bulbed head at said opposite end as said pin is moved relatively through said sleeve, said head forming means comprising a first wire drawing portion having a maximum preselected diameter larger than that of said through bore and a second reduced wire drawing portion located adjacent said first portion having a maximum diameter greater than said preselected diameter but less than said first portion, said first wire drawing portion adapted to be wire drawn and located in said through bore as said pin and said sleeve are set and said reduced wire drawing portion adapted to be wire drawn and at least partially located in said through bore as said pin and said sleeve are set, said first portion having a first tapered portion for initially engaging said opposite end of said shank portion, and a head portion terminating the opposite end of said pin and having a second tapered portion tapering from said reduced portion to a diameter greater than said reduced portion, said second tapered portion engaging said opposite end of said shank portion, lock receiving means in said preformed head and said pin for defining a lock receiving cavity with said pin and said sleeve located in preselected relative positions, and lock means deformable into said cavity for locking said pin and said sleeve together.

9. A multipiece rivet for fastening a pair of workpieces having aligned openings comprising: a hollow sleeve having a shank portion adapted to project through the aligned openings and beyond one side of the workpieces and having a preformed head on one end of said shank portion for engaging the other side of the workpieces, a pin located within said sleeve and extending beyond both ends thereof, head forming means on that end of said pin proximate to the opposite end of said shank portion for engaging and moving into said opposite end and for expanding said opposite end radially outwardly for forming a bulbed head at said opposite end as said pin is moved relatively through said sleeve, said head forming means comprising a first wire drawing portion having a maximum preselected diameter larger than that of said through bore and a second portion having a maximum diameter greater than said preselected diameter, said first portion having a first tapered portion for initially engaging said opposite end of said shank portion, said second portion having a second tapered portion for engaging said opposite end of said shank portion, a reduced diameter intermediate wire drawing portion located between said second tapered portion and said first portion and being of a diameter slightly less than said first wire drawing portion, said first wire drawing portion adapted to be wire drawn and located in said through bore as said pin and said sleeve are set and said reduced wire drawing portion adapted to be wire drawn and at least partially located in said through bore as said pin and said sleeve are set, lock receiving means in said preformed head and said pin for defining a lock receiving cavity with said pin and said sleeve located in preselected relative positions, and lock means deformable into said cavity for locking said pin and said sleeve together, said lock receiving means comprising an annular groove in said pin having a finite plurality of annular portions of varying diameter.

References Cited

UNITED STATES PATENTS

| | | | |
|---|---|---|---|
| 2,501,567 | 3/1950 | Huck | 85—78 |
| 2,526,235 | 10/1950 | Huck | 85—78 |
| 2,931,532 | 4/1960 | Gapp | 85—78 |
| 3,038,626 | 6/1962 | Simmons | 85—78 |
| 2,546,602 | 3/1951 | Keating | 85—78 |
| 3,285,121 | 11/1966 | Siebol | 85—72 |

FOREIGN PATENTS 1,377,442  9/1964  France.

CARL W. TOMLIN, *Primary Examiner.*

RAMON S. BRITTS, *Assistant Examiner.*